G. M. EATON.
RESILIENT DRIVING CONNECTION.
APPLICATION FILED JAN. 6, 1917.

1,321,512.

Patented Nov. 11, 1919.
2 SHEETS—SHEET 1.

WITNESSES:
Ed Plinke.
W. B. Wells

INVENTOR
George M. Eaton.
BY
Wesley G. Carr
ATTORNEY

G. M. EATON.
RESILIENT DRIVING CONNECTION.
APPLICATION FILED JAN. 6, 1917.
1,321,512.
Patented Nov. 11, 1919.
2 SHEETS—SHEET 2.
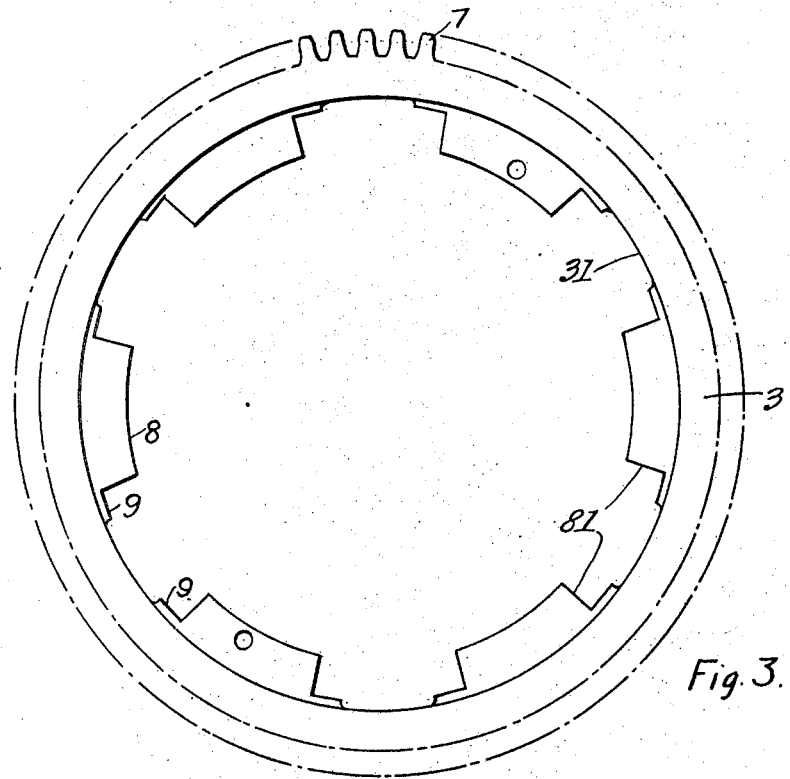
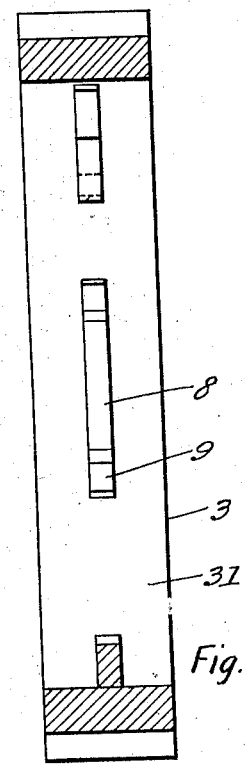
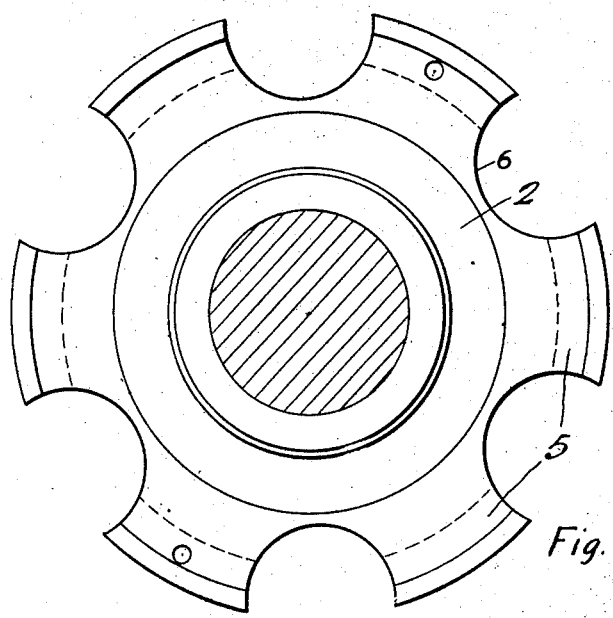
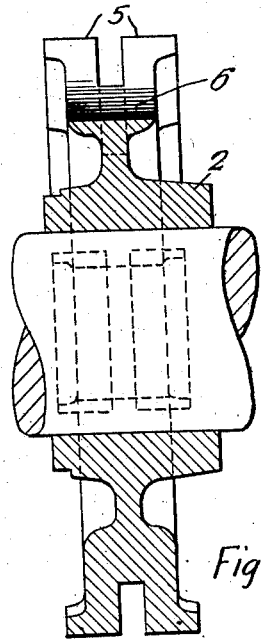
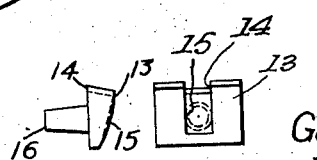
WITNESSES:
Ed Plinke.
W. B. Wells.
INVENTOR
George M. Eaton.
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

RESILIENT DRIVING CONNECTION.

1,321,512.

Specification of Letters Patent. Patented Nov. 11, 1919.

Application filed January 6, 1917. Serial No. 140,929.

*To all whom it may concern:*

Be it known that I, GEORGE M. EATON, a citizen of the United States, and a resident of Pittsburgh, in the county of Allegheny and State of Pennsylvania, have invented a new and useful Improvement in Resilient Driving Connections, of which the following is a specification.

My invention relates to resilient driving connections and particularly to flexible gear wheels for service in electric vehicles to connect the propelling motors to the driving wheels.

One object of my invention is to provide a resilient gear wheel of the above-indicated character which shall be assembled and dismantled with facility, be strong and rigid in construction and be manufactured at a minimum cost.

Another object of my invention is to provide a resilient gear wheel which shall be composed of a hub and a rim member, with spring connectors disposed between said members for resiliently joining the same, and means associated with the rim member for preventing lateral displacement of the spring connectors relatively to the hub and rim members.

More specifically, my invention embodies a resilient gear wheel having a hub member provided with laterally-spaced radial projections extending therefrom and semi-cylindrical pockets formed between the projections. A rim member surrounds the hub member and is provided with radial projections which register with the hub projections. In the semi-cylindrical pockets are disposed spring connectors for joining the hub and rim members and lugs which are disposed on the rim member adjacent to the rim projections to engage grooves in the spring connectors for preventing lateral displacement of the latter relatively to the hub and rim members.

Figure 1:
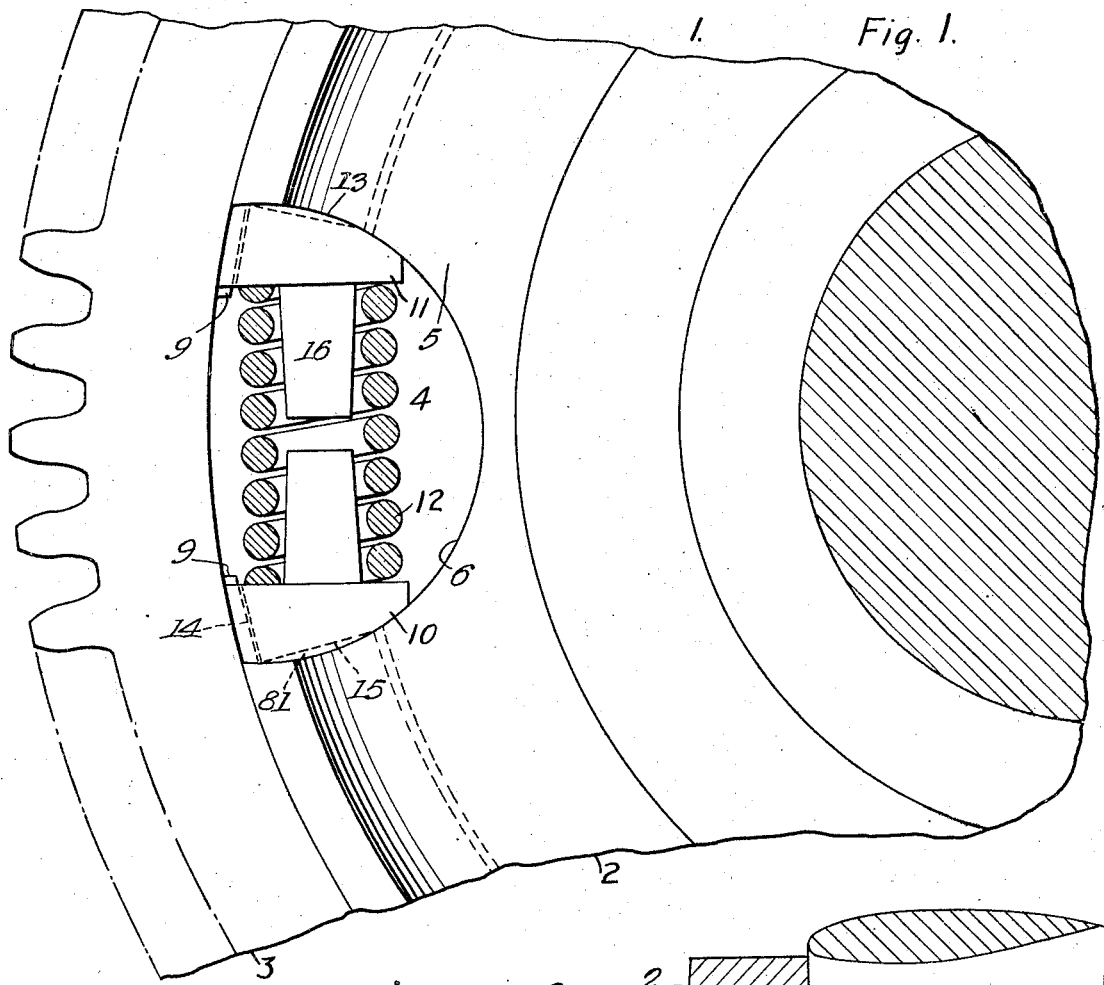
Figure 2:
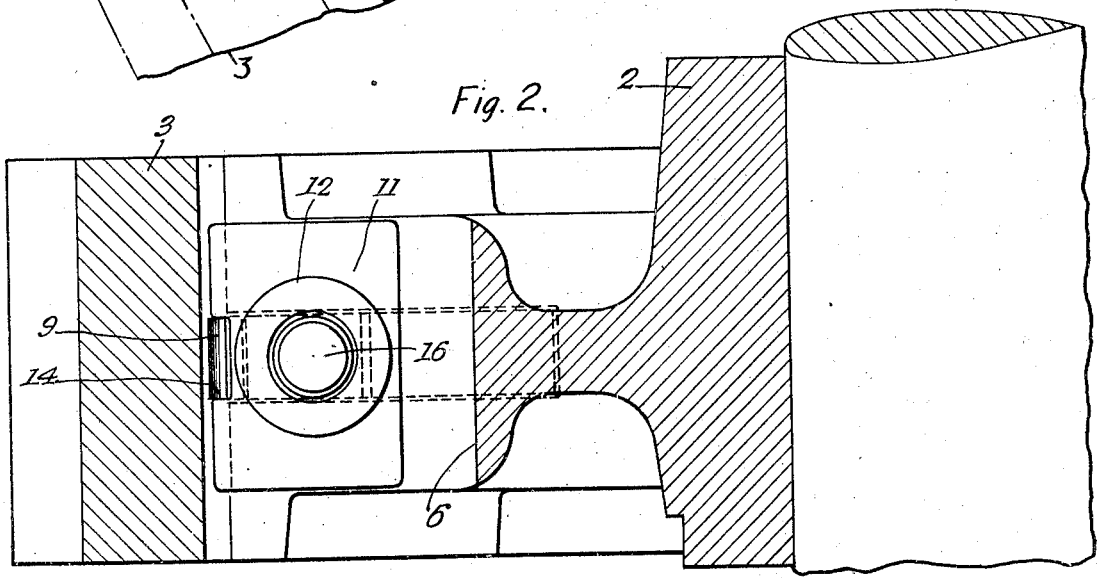

In the accompanying drawings, Figure 1 is a partial elevational view of an assembled gear wheel constructed in accordance with my invention; Fig. 2 is a sectional view of the gear wheel illustrated in Fig. 1; Figs. 3 and 4 are side elevational and sectional views of the rim member of the gear illustrated in Fig. 1; Figs. 5 and 6 are side elevational and sectional views of the hub member of the gear illustrated in Fig. 1; and Figs. 7 and 8 are detail views of one of the spring seats.

Referring to the accompanying drawings, a gear wheel 1 embodies a hub member 2, a rim member 3, and spring connectors 4 for resiliently joining the hub and rim members. The hub member 2 is provided with laterally-spaced radial projections 5 and substantially semi-cylindrical outwardly-facing pockets 6 which are formed between the various pairs of radial projections, the axis of the curved wall of each pocket lying in the periphery of the hub and parallel to the axis of the hub and rim, or, in other words, in a plane that includes the axis of the hub and rim and the center of the pocket. The rim member 3 is provided with gear teeth 7 on the outside periphery thereof and with inward radial projections 8 which are disposed between, and interfit and register with, the radial projections 5 of the hub member 2, both sets of projections being angularly spaced about the axes of the hub and rim. The rim member 3 is also provided with lugs 9 that are integral with and of the same curvature as the rim member 3 and extend from the basis of the projections 8 along the inner face 31 of the rim member. When the parts are assembled, the lugs 9 project into the semi-cylindrical pockets 6 of the hub member for a purpose to be described later.

Each of the spring connectors 4, which serves to resiliently connect the hub and the rib members, embodies two spring seats 10 and 11 which are similar in construction and a helical spring 12 which is disposed between the spring seats 10 and 11, as illustrated in Fig. 1 of the drawings. Each of the spring seats is provided with a partial cylindrical surface 13 of the same radius as the pockets 6 formed in the hub member 2, grooves 14 and 15 which are respectively adapted to receive a lug 9 and a radial edge 81 of a radial projection 8 of the rim member 3, and a stem 16 which extends within the spring 12, as illustrated in Fig. 1 of the drawings.

By constructing a gear wheel with substantially semi-cylindrical pockets between the radial projections of the hub member, the cost of the gear wheel is greatly reduced by reason of the simplicity of the machining operation in forming the spring pockets.

The pockets 6 are formed by a drilling operation and it is possible to drill a pocket in each of two hub members simultaneously by placing two hub members tangent to each other and drilling the pockets with the tangent point as a center, whereby the single pocket between each succeeding pair of hub projections has a continuously curved surface, the center of curvature of which is in the periphery of the hub.

In assembling the gear wheel, the rim member 3 is mounted on the hub member 2 with the rim projections 8 registering and interfitting with the radial projections 5. The assembled spring connectors 4 are then compressed so that they may be inserted in the pockets 6 between the radial projections 5, with the lugs 9 and the projections 8 respectively disposed within the grooves 14 and 15 of the spring seats 10 and 11. The lugs 9 and the radial projections 8, which are disposed within the grooves 14 and 15 of the spring seats, prevent any lateral displacement of the spring connectors 4 relatively to the hub and rim members.

In operating the gear wheel 1, a driving force is applied to the rim member 3 or the hub member 2 and the spring 12 compressed until the stems 16 of the spring seats 10 and 11 of the spring connectors engage each other and then the gear wheel functions as a solid gear wheel.

Various modifications in the driving connection set forth may be made within the spirit and scope of my invention, and I desire that only such limitations shall be imposed as are indicated in the appended claims.

I claim as my invention:

1. In a driving connection, the combination with a hub and a rim member having interfitting radially-extending parts, said rim member having lugs located adjacent to the radially-extending parts, of connectors for joining the hub and rim members, said connectors having grooves for receiving said lugs and end portions of said rim-projecting parts for restraining the connectors from lateral displacement relatively to the hub and rim members.

2. In a resilient driving connection, the combination with a hub and a rim member having interfitting parts spaced angularly about the axis thereof, said rim members having inwardly projecting lugs located adjacent to said rim parts, of resilient connectors for joining said members, said connectors having grooves to receive said rim lugs for restraining the connectors from lateral displacement relatively to the hub and rim members.

3. In a resilent driving connection, the combination with a hub member and a rim member surrounding the hub member, said members having interfitting radially-extending parts spaced angularly about the axis thereof, said rim member having lugs located adjacent to the radially extending parts, of spring connectors for joining the hub and rim members, said connectors comprising devices having grooves for receiving said lugs and the rim projecting parts for restraining the connectors from lateral displacement relatively to the hub and rim members.

4. In a resilient driving connection, the combination with a hub member having radial projections extending therefrom and a single substantially semi-cylindrical pocket formed between each pair of projections, of a rim member having inward radial projections which register with the hub projections, and spring connectors disposed within the pockets between the hub and rim projections and adapted to resiliently connect the hub and rim members.

5. In a resilient driving connection, the combination with a hub member having radial projections extending therefrom and forming a single substantially semi-cylindrical pocket between successive radial hub projections, of a rim member having radial projections which register with the hub projections, and spring connectors for resiliently joining said hub and rim members, said rim member having lugs projecting from the rim member for restraining the spring connectors from lateral displacement relatively to the rim member.

6. In a resilient driving connection, the combination with a hub member having radial projections and a rim member having radial projections which register with said hub projections, of spring connectors disposed between said projections for resiliently joining the hub and rim members, said rim member having lugs projecting therefrom and extending from the bases of the rim projections along the inner faces of the rim for restraining the spring connectors from lateral movement relatively to the hub and rim members.

7. In a driving connection, the combination with a hub member, of a rim member surrounding the same and supported thereon, said members having interfitting radial projections and pockets therebetween, the rim member also having lugs thereon extending from the bases of the rim projections along the inner face of the rim, and devices in said pockets for operatively connecting said members, said devices comprising means coöperating with said lugs to restrain the displacement of said devices from said pockets.

8. In a resilient driving connection, the combination with a hub member, of a rim member mounted thereon, said members having interfitting angularly-spaced radial projections and pockets between said projections, the rim member also having integral lugs thereon extending from the bases of said rim projections along the inner face of the rim, and spring connectors in said pockets for operatively connecting said members, said connectors comprising spring seats having recesses therein fitting said rim projections and other recesses fitting edge portions of said rim projections, whereby the displacement of said connectors from said pockets is restrained.

9. In a driving connection, the combination with a hub member, of a rim member surrounding the same, one of said members having pockets therein opening opposite the other member, each pocket having a semi-cylindrical wall the axis of which lies in a plane including the axis of said members and the center of the pocket, and means in said pockets for operatively connecting said members.

10. In a resilient driving connection, the combination of a hub member, a rim member surrounding the same, one of said members having semi-cylindrical pockets therein facing the other member, and means in said pockets for operatively connecting said members comprising springs and spring seats, the spring seats in each pocket engaging curved portions of the pocket walls which have the same axis of curvature.

11. In a driving connection, the combination of a hub member, a rim member surrounding the same, said hub member having pockets therein opening in the periphery thereof opposite the rim member, each pocket being limited by a semi-cylindrical wall having a center disposed in the periphery of the hub parallel to the axis of the hub and rim, and devices in said pockets for operatively connecting said members.

12. In a resilient driving connection, the combination of a hub member, a rim member supported thereon, said hub member having pockets therein opening in the periphery thereof opposed to the rim member, the walls of the pockets being semi-cylindrical and having centers lying in the periphery of the hub, means in the pockets for resiliently connecting said members, said means comprising springs and spring seats, the spring seats in each pocket having curved portions engaging curved portions of the pocket walls, and means restraining the displacement of said connecting means from said pockets.

In testimony whereof, I have hereunto subscribed my name this 27th day of Dec., 1916.

GEORGE M. EATON.